J. H. GODFREY.
BOTTLE FILLING DEVICE.
APPLICATION FILED MAY 4, 1916.

1,306,890.

Patented June 17, 1919.
2 SHEETS—SHEET 1.

Inventor
Joseph H. Godfrey
By Pond & Wilson
Attys

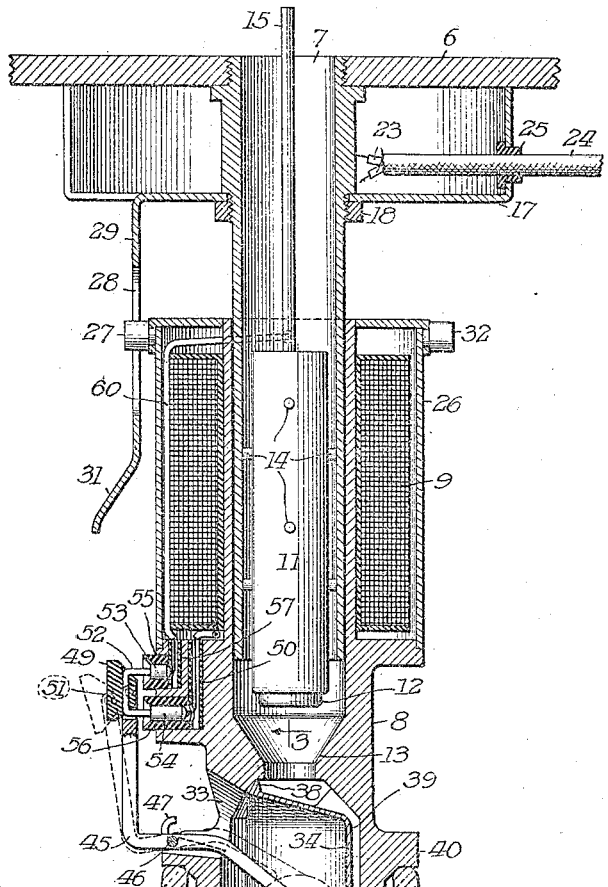

UNITED STATES PATENT OFFICE.

JOSEPH H. GODFREY, OF CHICAGO, ILLINOIS, ASSIGNOR TO THE GODFREY MANUFACTURING COMPANY, OF CHICAGO, ILLINOIS, A CORPORATION OF ILLINOIS.

BOTTLE-FILLING DEVICE.

1,306,890.  Specification of Letters Patent.  Patented June 17, 1919.

Application filed May 4, 1916. Serial No. 95,482.

*To all whom it may concern:*

Be it known that I, JOSEPH H. GODFREY, a citizen of the United States, residing at Chicago, in the county of Cook and State of Illinois, have invented certain new and useful Improvements in Bottle-Filling Devices, of which the following is a specification.

This invention relates in general to bottle-filling mechanism, and has more particular reference to a bottle-filling device for filling milk bottles and the like, and in which the act of raising a bottle into filling position will automatically open a valve so as to permit the liquid to flow into the bottle, and which is equipped with mechanism for automatically closing the valve to shut off the flow of liquid when the bottle becomes full.

One of the primary objects of my present invention is the provision of a bottle-filling device of this general character which will be thoroughly sanitary, and with this end in view the device is constructed so that all rubber or other similarly insanitary material is eliminated from the construction, and all parts with which the milk or other liquid comes in contact are made of material which can be boiled or otherwise sterilized without being injured. Furthermore, my device is so constructed that when the liquid flow is shut off that remaining in the device below the shut-off valve will be held by atmospheric pressure and capillary attraction so that there will be no dripping of the liquid when the bottle is removed. Another sanitary feature of my device resides in the fact that the parts which come in contact with the liquid are detachable so that they can be readily removed for purposes of cleaning and sterilization.

Another object of my invention is the provision of a device of this character in which the bottle being filled will be directly open to the atmosphere so that the air displaced from the bottle may readily escape, thus obviating any possibility of the device becoming air bound.

A further object is to provide a filling device which will deliver liquid to a bottle in such a way that frothing or foaming of the liquid is entirely eliminated.

Still another object is to provide novel and improved means for automatically shutting off the flow of liquid when the bottle has been filled to a predetermined level, thus preventing overflow of the bottles and insuring that all the bottles will be filled to the same height.

Various other objects and many attendant advantages of this invention will be readily appreciated as the same becomes better understood by reference to the following description when considered in connection with the accompanying drawings. Referring to the drawings—

Fig. 2 is a longitudinal sectional view taken on the line 2—2 of Fig. 1;

Fig. 3 is a fragmentary sectional view on the line 3—3 of Fig. 2; and

Fig. 4 is a detail top plan view of the removable deflector.

Figure 1:
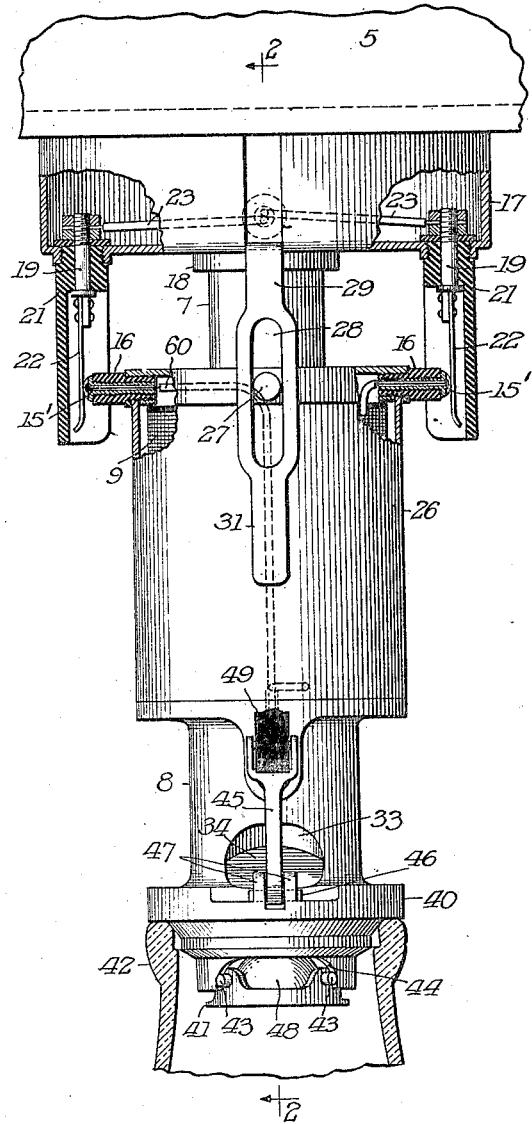
Figure 1 is a side elevation of a device embodying my invention.

Referring to the drawings, reference character 5 designates generally a tank or reservoir suitably supported and comprising the usual supply tank of a filling machine of any approved type, the bottom 6 of which is threaded for a liquid-tight connection with a depending tube 7 through which the milk or other liquid is delivered from the tank to the bottles. A head, designated generally by reference character 8, is mounted so as to fit snugly but to slide vertically upon the tube 7. This head carries on its upper portion the windings 9 of an electromagnet, the armature of which consists of a metal body or plunger 11 slidably disposed within the tube 7 and shaped at its lower end to form a valve 12 which is adapted to snugly fit a seat 13 formed in the head 8, to thereby shut off the flow of liquid through the head. It will be observed from Fig. 2 that the body of the valve is of smaller diameter than the tube 7 to permit liquid to flow around it, and that it is guided in the tube by a series of lugs or radially projecting pins 14 and has an upwardly extending stem 15 projecting into the tank 5 by means of which the valve may be readily lifted out for purposes of cleaning.

The two ends of the wire which forms the coil of the electromagnet terminate at their upper ends in terminals or contact members 15′ suitably mounted in insulated bushings 16, and upon a cylindrical housing 17, supported upon the tube 7 just beneath the tank 5 by a lock nut 18, I have mounted a pair of binding posts 19, as shown in Fig. 1. These binding posts are carried by insulated members 21 which are channel-shaped at their lower ends to afford protection to a pair of spring contact members 22 through which electric contact is made with the contact members 15' when the filling head is in elevated position, as shown. The upper ends of the binding posts 19 are connected to the current wires 23 through which current is supplied from any suitable source, these wires being preferably formed into an insulated cable 24, as shown in Fig. 2, which passes through an insulated bushing 25 located in one of the side walls of the housing 17.

In order to prevent the head 8 from turning on the tube 7 in its reciprocatory movements I have provided a protective housing 26 which surrounds the coils 9 of the electromagnet with a guiding stud 27 which slidably engages an elongated slot 28 formed in a downwardly extending guide or finger 29 depending from the housing 17. This finger, which is preferably made of resilient metal, is bent outwardly at its lower end as indicated at 31 so that it may be grasped and pulled away from the head sufficiently to disengage the stud 27 whenever it may be desirable to remove the head from the tube. A similar stud 32 is provided on the opposite side of the housing 26 so that the position of the head may be reversed to dispose the stud 32, instead of the stud 27, in coöperative relation with the slot 28, in case the machine upon which the filling device is used should require such reversal.

The lower end of the head 8 is shaped to provide an enlarged bore or passageway beneath the valve-seat 13 and is provided at one side with a lateral opening 33 through which air may escape from the bottle and in which the arm of a float member, to be later described, works. Within this enlarged lower end of the bore there is detachably positioned and held, preferably by friction, a deflecting member, indicated generally by reference character 34, which is of general cylindrical shape, having an inclined top and three radial ribs 35, 36 and 37, which snugly fit the walls of the surrounding bore, the top of the ribs 35 and 37 being connected by a transversely disposed upwardly extending flange 38 which makes a tight fit with the top wall of the enlarged bore and prevents leakage of fluid around the member. The member is shaped so that the space between it and the adjacent walls of the bore forms a narrow arcuate passage 39 through which the fluid flows from the valve-seat to the discharge end of the head. It will be observed from Fig. 2 that the lower end of the member 34 extends beneath the lower end of the head 8 and the walls thereof are flared outwardly to provide a deflector 41 by which the outflowing liquid is deflected laterally so that it is discharged against the walls of a bottle 42 being filled, the upper end of the bottle being engaged with an annular flange 40 formed on the head 8. The cross-sectional area of the passage 39 is greater than the area of the valve port or some other restriction above the passage so that under the resulting decreased pressure the velocity of the flowing liquid is materially reduced in this narrow passage and the liquid is delivered gently against the walls of the bottle, down which it flows in a thin stream into the bottle without frothing or foaming in the slightest degree. One side of the member 34 is open and forms, in conjunction with the lateral opening 33 in the head, a practically unobstructed passageway through which air displaced from the bottle being filled may escape directly to the atmosphere. In order to properly center the member 34 in the head it is provided at its lower end with a pair of radially extending studs 43 which engage with the sides of a recess 44 formed in the lower end of the head, as shown in Fig. 1. The deflector, while firmly held in position by frictional engagement of its ribs 35, 36 and 37 with the surrounding walls of the bore of the head, may be removed for purposes of cleaning and sterilization by simply pulling it downward against the frictional resistance. If preferred, however, a retaining device of suitable construction either positive or yielding in its operation might be employed to retain the deflector in position.

For the purpose of breaking the circuit of the electromagnet to permit the valve 11 to close and shut off the flow of liquid when a bottle has been filled I have provided the following mechanism. A lever 45 provided with a transverse pintle 46 is detachably fulcrumed by the pintle in an open top bearing formed on the head 8 outside of the opening 33, and this lever is normally retained in position by a pair of fingers 47 extending upwardly and over the bearing but adapted to permit the lever to be lifted out when its removal is desired. The inner end of the lever projects within the member 34 as shown in Fig. 2 and is equipped with a float 48, preferably consisting of a semi-spherical member, beneath which air is trapped when the liquid level in the bottle reaches the lower edge of the float and whereby the float is then elevated. The upper end of the lever 45 is bifurcated as shown in Fig. 1 and a block 49 of insulating material is pivotally mounted therein on a pivot pin 51. The block is so shaped that a limited amount of rocking movement on the pivot pin is permitted. A contact member 52 of U-shape, as shown in Fig. 2, is fixedly mounted in the block 49 so that its parallel contact ends project toward the head in alinement with the terminal contact members 53 and 54 mounted in insulated bushings 55 and 56, respectively. The end of the wire which forms the winding of the electromagnet is led through a suitably insulated bushing 50 to the contact member 54, to which it is soldered or otherwise rigidly secured. The wire 60 which terminates at its upper end in the other contact member 15 is led through an insulated bushing 57 to the terminal contact member 53 to which it is soldered. It will thus be obvious that the electric circuit between the contact members 15 is completed through the winding of the electromagnet, the terminal contact 54, the movable contact 52, the terminal contact 53, and the wire 60. When the float 48 is lifted by the liquid in the bottle, as previously explained, the arm 45 is rocked into the dotted line position shown in Fig. 2 to withdraw the contact member 52 from the members 53 and 54 and thereby break the circuit, which permits the valve 12 to close upon its seat.

The operation of my improved filling device is as follows: Normally the float is in the position shown in full lines in Fig. 2, so that the contact member 52 engages the contacts 53 and 54. The filling head is in lowered position on the tube 7 so that the contacts 15 are disposed below the spring contact members 22. The valve 12 is held against its seat by gravity. Assume now, that a bottle is placed in position beneath the head and is elevated by suitable mechanism so as to slide the head upwardly on the tube 7 by reason of the engagement of the mouth of the bottle with the annular flange 40. When the head is moved upwardly sufficiently to bring the contact members 15 into engagement with the contact members 22 the electric circuit through the electromagnet is closed and the valve 12, which is carried by the armature 11 of the electromagnet, is raised from its seat into the position shown in Fig. 2, thereby permitting a flow of liquid through the valve seat and through the narrow passageway 39 into the bottle. The deflecting flange at the lower end of the member 34 causes the liquid to be delivered laterally against the side walls of the bottle, and by reason of its slow speed and the direction in which it is delivered in a thin sheet all foaming or frothing of the liquid is prevented. The air displaced from the bottle passes freely to the atmosphere through the central opening in the member 34 and the opening 33 in the filling head. When the liquid level in the bottle approaches the top of the bottle the float 48 is elevated, thereby rocking the lever 45 on its fulcrum and withdrawing the contact members 52 from the contacts 53 and 54 to break the electric circuit and permit the valve 12 to close under the action of gravity. Since there is no air inlet to the passage 39 beneath the valve seat, the liquid which is disposed in this passage when the valve 12 closes is trapped and held therein by atmospheric pressure upon the lower end of the passage and by the capillary attraction between the liquid and the side walls of the passage. This construction precludes any dripping of the liquid when the bottle is removed. So long as the bottle remains in position the float will be retained in elevated position. When, however, the bottle is removed the float will drop, but before the circuit can be closed by the contact member 52 the head will have been lowered on the tube 7 sufficiently to dispose the contact members 15' below the members 22 so that the circuit remains open and the valve 12 remains closed. This operation is repeated as each bottle is moved into filling position beneath the head, the circuit being closed to open the valve by upward movement of the head and being opened to close the valve by the action of the float.

It is believed that my invention and its mode of operation will be readily understood from the foregoing without further description, and while I have shown and described a preferred embodiment of the invention, it should be obvious that the various structural details illustrated and described are capable of considerable modification and variation without departing from the essence of the invention as set forth in the following claims.

I claim:

1. A bottle-filling device, comprising a head having a delivery passage at the lower end thereof, a valve controlling said delivery passage and a deflector at the delivery end of said passage below said valve whereby the liquid is delivered from the head laterally against the walls of the bottle being filled.

2. A bottle-filling device, comprising a head provided with a valve-seat and an enlarged bore beneath said seat, and a member disposed in said bore forming, with a portion of the walls of said bore, a narrow delivery passage opening laterally at its delivery end.

3. A bottle-filling device, comprising a head provided with a bore and a valve-seat, a valve adapted to close the bore at said seat, and means in said bore beneath said seat providing an air discharge passage and forming, with a portion of the walls of said bore, a narrow laterally opening fluid delivery passage.

4. A bottle-filling device, comprising a head provided with a valve seat and valve and having an enlarged bore at its delivery end below said valve seat, and a member removably positioned in said bore forming a central air escape passage and a lateral fluid delivery passage.

5. A bottle-filling device, comprising a head provided with a valve-seat and having an enlarged bore beneath said seat, and a substantially cylindrical member removably positioned in said bore and shaped to divide the bore into an air escape passage and a fluid delivery passage.

6. A bottle-filling device, comprising a head provided with a valve-seat and an enlarged bore beneath said seat having an opening at one side thereof, and a member detachably positioned in said bore to divide the bore into a fluid delivery passage and an unobstructed air escape passage communicating with said lateral opening, the lower end of said member being shaped to provide a deflecting flange whereby said liquid is delivered in a lateral direction from said head.

7. In a bottle-filling device, the combination of a vertically reciprocable head carrying the coils of an electromagnet, a valve adapted to be opened upon energization of said coils, means including a contact carried by the head for closing an electric circuit including said coils when the head is raised, and means including a pair of stationary contacts, and a movable cross contact member for opening said circuit when the level of the liquid in the bottle reaches a predetermined height.

8. In a bottle-filling device, the combination of a vertically reciprocable filling-head, electromagnetic coils carried thereby, a pair of stationary contact members normally disposed above said head, a pair of contacts connected to said coil and adapted to engage with said contact members to close the circuit when the head is raised, and means for opening said circuit when the liquid in the bottle being filled reaches a predetermined level.

9. In a bottle-filling device, the combination of a head, an electromagnetic coil carried thereby, a valve controlled by said coil, a pair of contact members forming part of the electric circuit in which said coil is disposed, a pivoted lever carried by said head, a float mounted on one end thereof, and a cross contact member pivotally mounted on the other end, said member being normally in engagement with said contact members but adapted to be withdrawn therefrom to open the circuit when the liquid level in the bottle reaches a predetermined height.

10. In a bottle-filling device, the combination of a filling head having an enlarged bore at its lower end, a member removably positioned in said bore and shaped to provide a central air escape passage and a lateral fluid delivery passage, a float member arranged in said central passage, an electrically controlled valve disposed above said enlarged bore, means carried by the head for closing the circuit to open said valve upon upward movement of the head, and means controlled by said float and including a pivotally mounted contact member for opening said circuit when the level of the liquid in a bottle being filled reaches a predetermined height.

11. A bottle-filling device, comprising a fluid supplying passage having a narrow arcuate delivery end of greater cross-sectional area than the cross sectional area of said passage at a point above said delivery end whereby fluid is delivered therefrom under reduced pressure and at reduced velocity, said delivery end being shaped to deliver the fluid in a thin stream and in a lateral direction.

JOSEPH H. GODFREY.

Copies of this patent may be obtained for five cents each, by addressing the "Commissioner of Patents, Washington, D. C."